United States Patent
Wang et al.

(10) Patent No.: US 12,313,169 B2
(45) Date of Patent: May 27, 2025

(54) CONTROL VALVE AND SEALING COMPONENT

(71) Applicant: ZHEJIANG SANHUA AUTOMOTIVE COMPONENTS CO., LTD., Zhejiang (CN)

(72) Inventors: Lixin Wang, Zhejiang (CN); Long Lin, Zhejiang (CN); Yun Wang, Zhejiang (CN)

(73) Assignee: ZHEJIANG SANHUA AUTOMOTIVE COMPONENTS CO., LTD., Zhejiang (CN)

( * ) Notice: Subject to any disclaimer, the term of this patent is extended or adjusted under 35 U.S.C. 154(b) by 50 days.

(21) Appl. No.: 18/555,550

(22) PCT Filed: Apr. 15, 2022

(86) PCT No.: PCT/CN2022/087034
§ 371 (c)(1),
(2) Date: Oct. 16, 2023

(87) PCT Pub. No.: WO2022/218406
PCT Pub. Date: Oct. 20, 2022

(65) Prior Publication Data
US 2024/0200672 A1 Jun. 20, 2024

(30) Foreign Application Priority Data
Apr. 16, 2021 (CN) .......................... 202110412391.8

(51) Int. Cl.
*F16K 11/08* (2006.01)
*F16K 11/085* (2006.01)
(52) U.S. Cl.
CPC ................ *F16K 11/0856* (2013.01)

(58) Field of Classification Search
CPC .................................................. F16K 11/0856
See application file for complete search history.

(56) References Cited

U.S. PATENT DOCUMENTS

2018/0313457 A1 11/2018 Shen
2018/0328501 A1* 11/2018 Hiraoka ................ F16K 11/085
(Continued)

FOREIGN PATENT DOCUMENTS

CN 103791114 A 5/2014
CN 108798863 A 11/2018
(Continued)

OTHER PUBLICATIONS

First Office Action dated Jul. 30, 2024 for Japanese patent application No. 2023-563123, English translation provided by Global Dossier.
(Continued)

*Primary Examiner* — Kevin R Barss
(74) *Attorney, Agent, or Firm* — Yue (Robert) Xu; Apex Attorneys at Law, LLP

(57) ABSTRACT

A control valve, includes a valve body, a valve core, and a sealing component. The control valve includes communication ports; the communication ports are communicated with a valve cavity (101); the communication ports comprise first communication ports; the first communication ports are arranged along the height direction of a side wall portion and the circumferential direction of the side wall portion; two first communication ports is arranged on the side wall portion along the circumferential direction of the side wall portion; the sealing component includes a sealing body portion; the sealing body portion is located between the valve core (20) and the side wall portion; the sealing body portion has through holes.

20 Claims, 10 Drawing Sheets

(56) References Cited

U.S. PATENT DOCUMENTS

| | | |
|---|---|---|
| 2018/0372235 A1 | 12/2018 | Smith |
| 2020/0197961 A1 | 6/2020 | Zhang et al. |
| 2020/0378515 A1* | 12/2020 | Ono .................... F16K 5/0414 |

FOREIGN PATENT DOCUMENTS

| | | |
|---|---|---|
| CN | 209278546 U | 8/2019 |
| CN | 110440032 A | 11/2019 |
| CN | 113864490 A | 12/2021 |
| CN | 215487806 U | 1/2022 |
| CN | 215928493 U | 3/2022 |
| JP | 2003-314716 A | 11/2003 |
| JP | 2018184937 A | 11/2018 |

OTHER PUBLICATIONS

International Search Report for PCT/CN2022/087034 mailed Jul. 15, 2022, ISA/CN.

* cited by examiner

CONTROL VALVE AND SEALING COMPONENT

The present application is a National Phase entry of PCT Application No. PCT/CN2022/087034, filed on Apr. 15, 2022, which claims priority to Chinese Patent Application No. 202110412391.8, titled "CONTROL VALVE", filed on Apr. 16, 2021 with the China National Intellectual Property Administration, which [is] are incorporated herein by reference in their entireties.

FIELD

The present application relates to the technical field of fluid control, and in particular to a control valve and a sealing member.

BACKGROUND

Some systems are required to use a multi-path control valve to control flow paths. In order to realize fluid control for multiple flow paths via the control valve, multiple flow channels are required to be provided in the control valve, and a sealing member is required to seal the multiple flow channels. How to arrange the multiple flow channels and the sealing member to control the multiple flow paths and reduce the manufacturing difficulty of the sealing member is an urgent problem to be solved.

SUMMARY

The purpose of the present application is to provide a control valve and a sealing member, which can realize fluid control in multiple flow paths, and also can reduce the manufacturing difficulty of the sealing member.

In one aspect, a control valve is provided according to an embodiment of the present application. The control valve includes a valve body, a valve core, and a sealing member. The valve body includes a side wall part, the control valve has a valve cavity, the side wall part is a peripheral wall of the valve cavity or at least part of the peripheral wall, at least part of the valve core is arranged in the valve cavity and is configured to be driven to rotate, at least part of the sealing member is arranged between the valve core and the side wall part along a radial direction of the valve core, the control valve is provided with multiple communication ports, the multiple communication ports include first communication ports, the first communication ports are arranged along a height direction of the side wall part and a circumferential direction of the side wall part, and two columns of the first communication ports are arranged in the side wall part along the circumferential direction of the side wall part; and the sealing member includes a sealing body, the sealing body is arranged between the valve core and the side wall part, the sealing body has multiple through holes going through the sealing member, at least part of the multiple through holes are correspondingly communicated with the first communication ports, the multiple through holes are arranged along a height direction of the sealing body and a circumferential direction of the sealing body, two columns of the through holes are arranged in the sealing body along the circumferential direction of the sealing body, an inner surface of the sealing body is an arc surface, and a central angle corresponding to the arc surface of the sealing body is greater than or equal to 100 degrees and less than or equal to 180 degrees.

In another aspect, a sealing member is provided according to the present application. The sealing member includes a sealing body, and the sealing body has multiple through holes going through the sealing member, the multiple through holes are arranged along a height direction of the sealing body and a circumferential direction of the sealing body, two columns of the through holes are arranged in the sealing body along the circumferential direction of the sealing body, an inner surface of the sealing body is an arc surface, a central angle corresponding to the arc surface of the sealing body is greater than 100 degrees and less than or equal to 180 degrees.

According to the control valve and the sealing member provided by the embodiments of the present application, the control valve includes the side wall part, the side wall part has first communication ports, the first communication ports are arranged along the height direction of the side wall part and the circumferential direction of the side wall part, and two first communication ports are arranged in the side wall part along the circumferential direction of the side wall part. Compared with the embodiment of arranging all the first communication ports along the circumferential direction of the side wall part, the area of the side wall part that needs to be sealed in the circumferential direction of the side wall part can be reduced. Correspondingly, the sealing body of the sealing member is arranged between the side wall part and the valve core, the sealing body is provided with the multiple through holes communicating with the first communication ports, the multiple through holes are arranged along the height direction of the sealing member and the circumferential direction of the sealing member, and two through holes are arranged along the circumferential direction of the sealing member, which can relatively reduce the arc length of the arc surface of the sealing member. The central angle corresponding to the arc surface of the sealing member is greater than or equal to 100 degrees and less than or equal to 180 degrees. Compared with the central angle corresponding to the arc surface of the sealing member greater than 180 degrees, the arc length of the arc surface of the sealing member in the embodiments of the present application is smaller, which can reduce the manufacturing difficulty of a product mold, reduce the manufacturing cost of the sealing member and the control valve, and improve the sealing performance of the control valve.

DETAILED DESCRIPTION OF EMBODIMENTS

Features and exemplary embodiments of various aspects of the present application are described in detail below. In order to make the purposes, technical solutions and advantages of the present application clearer, the present application is further described in detail below in conjunction with the drawings and specific embodiments. In this specification, relational terms such as "first" and "second" are only used to distinguish one element from another element with a same name, and do not necessarily require or imply any actual relationship or order between the elements.

Figure 1:
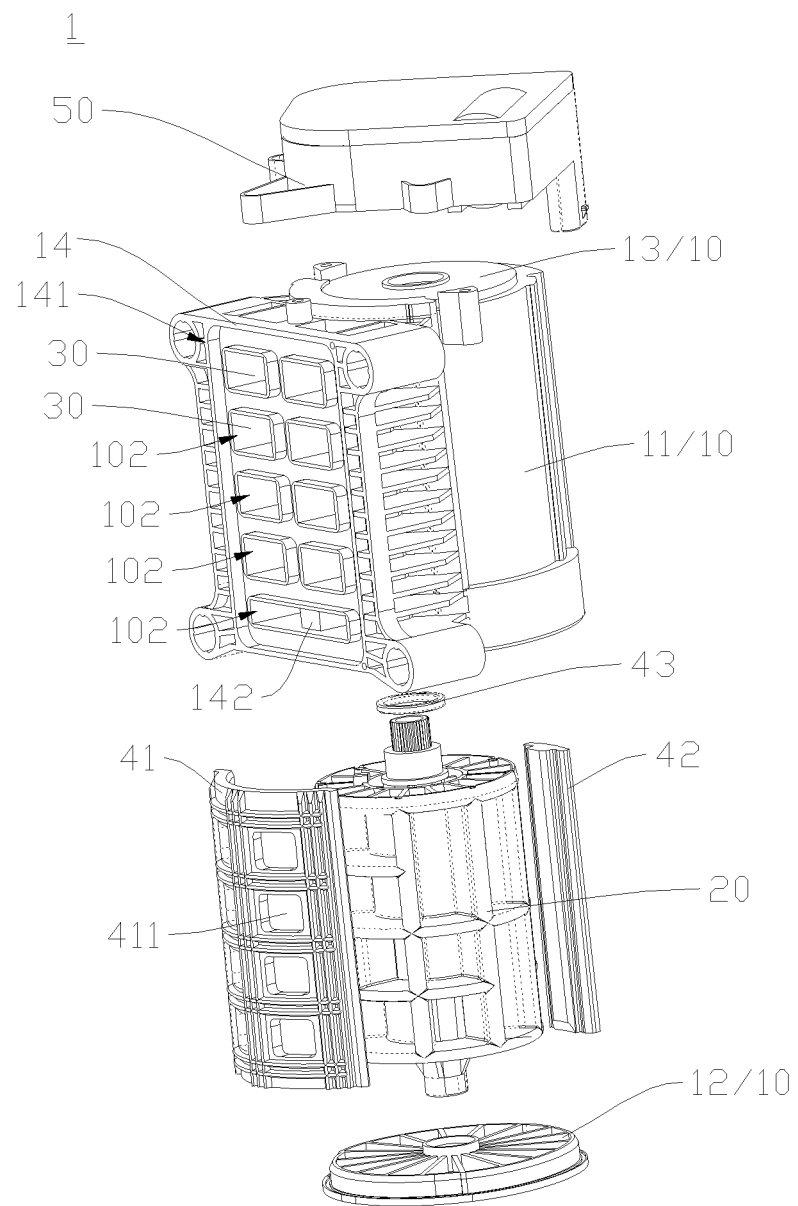
FIG. 1 is an exploded structural schematic diagram of a control valve provided according to an embodiment of the present application.
Figure 2:
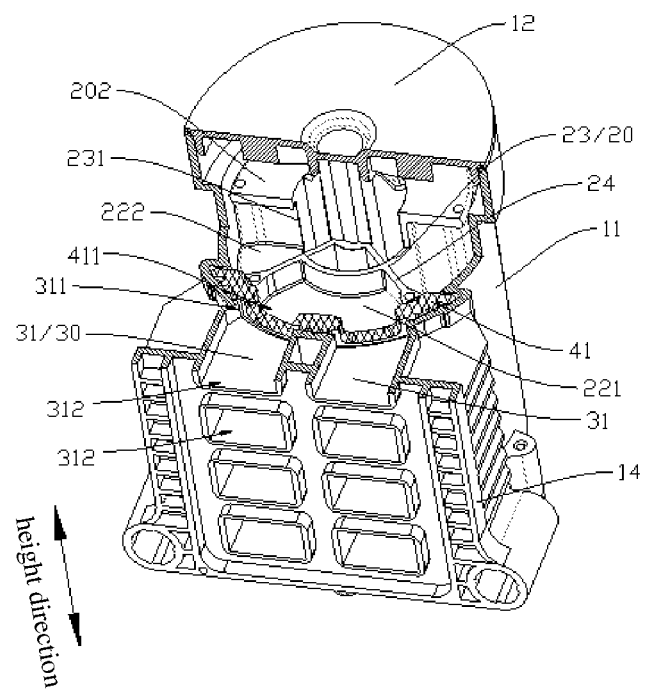
FIG. 2 is a schematic diagram of a partial cross-section structure of the control valve shown in FIG. 1 at a position.
Figure 3:
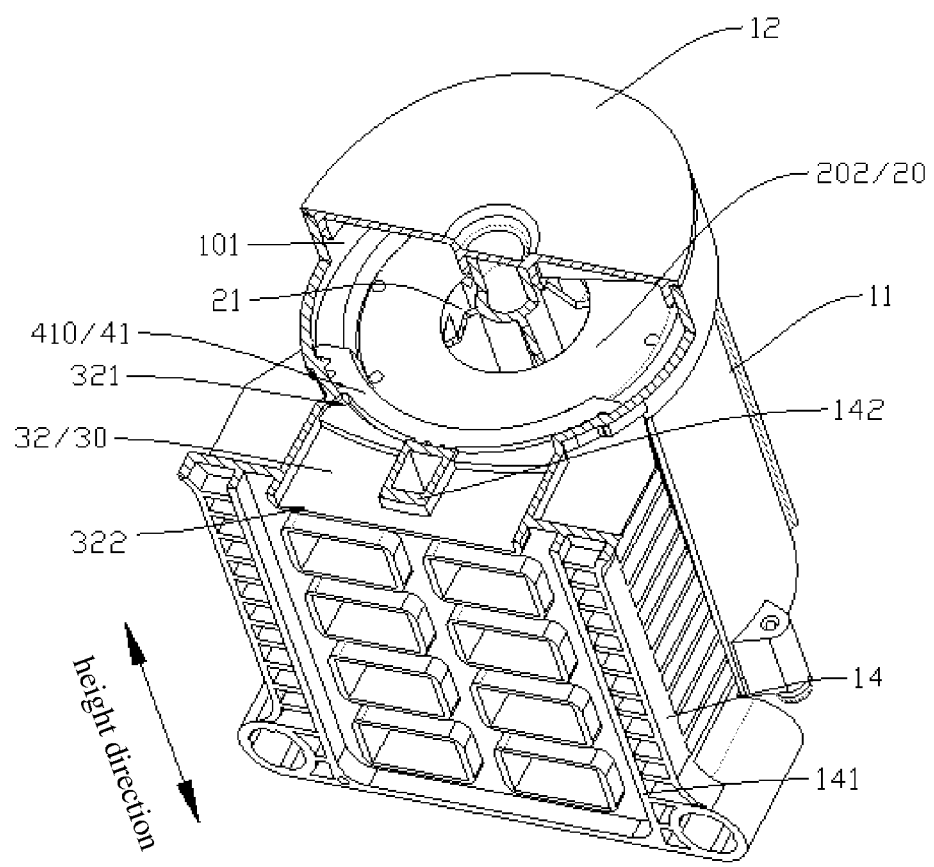
FIG. 3 is a schematic diagram of a partial cross-section structure of the control valve shown in FIG. 1 at another position.

As shown in FIGS. 1 to 3, a control valve 1 is provided according to an embodiment of the present application. The control valve 1 includes a valve body 10, a valve core 20, and a sealing member 41. The valve body 10 includes a side wall part 11, and the control valve 1 has a valve cavity 101. The side wall part 11 is a peripheral wall of the valve cavity 101 or at least part of the peripheral wall. At least part of the valve core 20 is arranged in the valve cavity 101 and can be driven to rotate. The control valve 1 may further include a driving device 50 and a sealing ring 43, the driving device 50 includes a driving element, and the driving element may be an electric motor or a motor and a reduction gear set. The valve core 20 can be rotated under the drive of the driving element in the driving device 50, and at least part of the sealing member 41 is arranged between the valve core 20 and the side wall part 11 along a radial direction of the valve core 20. In FIG. 1, the valve body 10 further includes a bottom wall part 12 and a top wall part 13, the bottom wall part 12, the top wall part 13, and the side wall part 11 enclose to form the valve cavity 101, and the sealing ring 43 is arranged between the top wall part 13 and the valve core 20. At least part of the side wall part 11 is arranged between the bottom wall part 12 and the top wall part 13. One of the bottom wall part 12 and the top wall part 13 is integrally formed with the side wall part 11, and the other of the bottom wall part 12 and the top wall part 13 is sealingly disposed with the side wall part 11. For example, in FIG. 1, the top wall part 13 is integrally formed with the side wall part 11, and the bottom wall part 12 may be fixedly connected to the side wall part 11 and is sealingly disposed with the side wall part 11 by welding, so as to prevent fluid leakage. The sealing ring 43 is arranged between the top wall part 13 and the valve core 20. During the assembly process, the valve core 20 is assembled from the bottom of the valve body 10 to the top of the valve body 10, which can reduce the deformation of the sealing ring 43 and improve the sealing performance of the sealing ring 43. The control valve 1 may include at least five channels 30, the side wall part 11 has at least five communication ports, and the at least five communication ports are connected to the valve cavity 101. One end of each of the at least five channels 30 penetrates through the side wall part 11 to form the communication port, and the other end of each of the at least five channels 30 forms a valve port 102 of the control valve 1. Fluid can enter or leave the control valve 1 from the valve end port 102. In a specific implementation, the number of the channels 30 and the number of the communication ports provided in the control valve 1 may be set according to requirements of a user.

In order to facilitate the assembly of the control valve 1 and other components in a fluid control system and improve the integration degree of the control valve 1 and other components, in some embodiments, as shown in FIGS. 1 to 3, the valve body 10 further includes a mounting part 14, the mounting part 14 is fixedly connected to the side wall part 11 and arranged on a side, facing away from the valve cavity 101, of the side wall part 11. For example, the mounting part 14 and the side wall part 11 may be integrally formed, the mounting part 14 has an mounting surface 141, and the valve port 102 of the control valve 1 penetrates through the mounting surface 141, so that all the valve ports 102 of the control valve 1 are provided in the mounting surface 141 and the orientations of the valve ports 102 are same, which can relatively simplify assembly steps of the control valve 1 and other components, reduce leakage points of connecting portions, and improve the reliability of sealing.

In some embodiments, a cross section of the sealing member 41 along a direction perpendicular to a height direction of the sealing member 41 is of an arc-shaped structure. The sealing member 41 includes a sealing body 410, the sealing body 410 is arranged between the valve core 20 and the side wall part 11 along the radial direction of the valve core 20, an inner surface of the sealing body 410 is in contact with the valve core 20, and an outer surface of the sealing body 410 is in contact with the side wall part 11. The communication ports of the side wall part 11 in the area where the side wall part 11 is in contact with the sealing body 410 are defined as the first communication ports 311. In this way, the communication ports in the side wall part 11 includes the first communication ports 311, the first communication ports 311 are arranged in an array along a height direction of the side wall part 11 and a direction perpendicular to the height direction of the side wall part 11, the valve ports 102 communicating with the first communication ports 311 are arranged in an array along the height direction of the side wall part 11 and the direction perpendicular to the height direction of the side wall part 11. As shown in FIG. 2, a profile of the mounting surface 141 of the mounting part 14 is roughly of a rectangular structure, a length direction of the mounting surface 141 is parallel to the height direction of the side wall part 11, and the valve ports 102 communicating with the first communication ports 311 are arranged in an array along a length direction and a width direction of the mounting surface 141.

Figure 4:
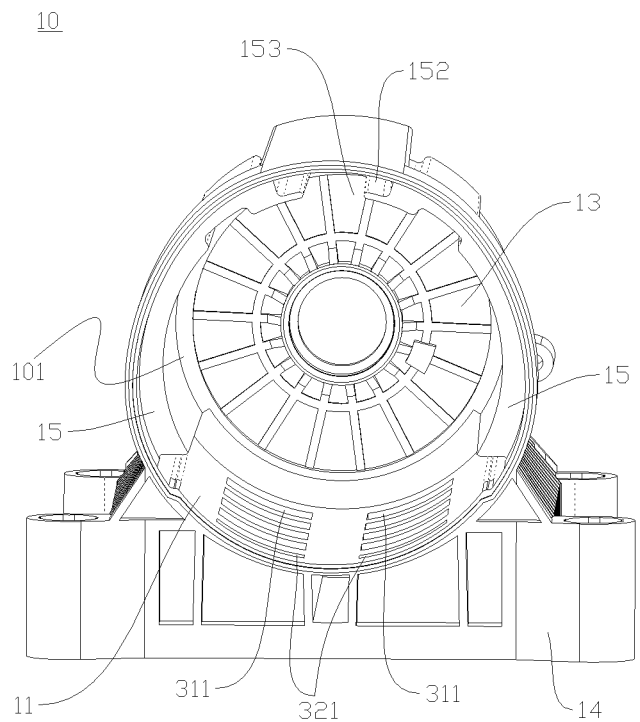
FIG. 4 is a structural schematic diagram of a valve body provided according to an embodiment of the present application.
Figure 5:
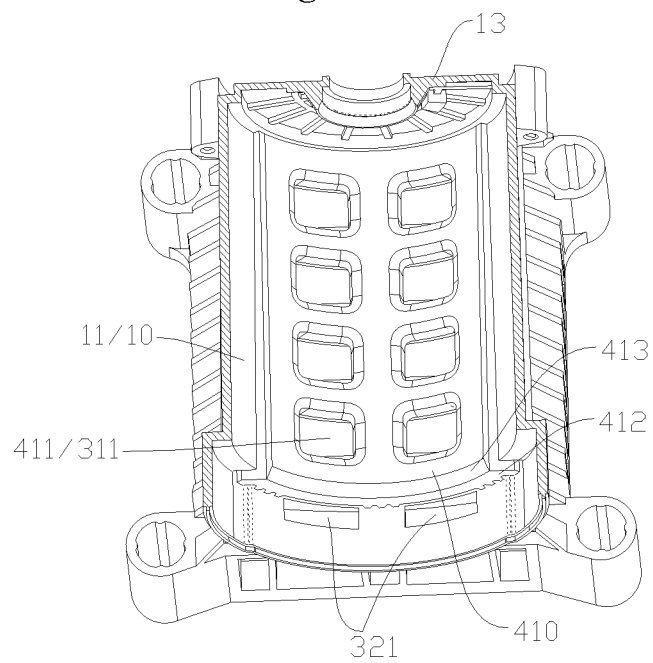
FIG. 5 is a schematic diagram of a partial cross-section structure of a combination structure of a valve body and a sealing member provided according to an embodiment of the present application at a position.
Figure 7:
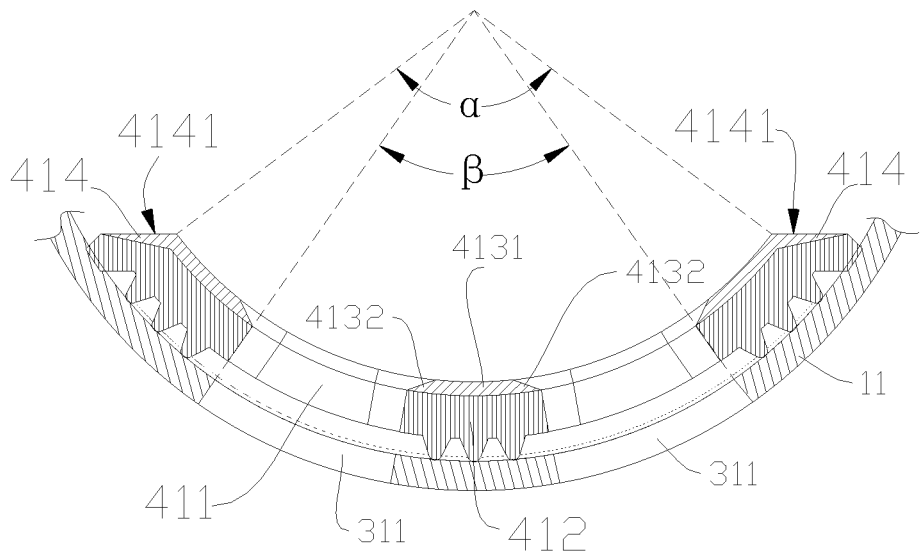
FIG. 7 is a schematic diagram of a partial cross-section structure of a cooperation of the sealing member shown in FIG. 6 and a valve body.
Figure 8:
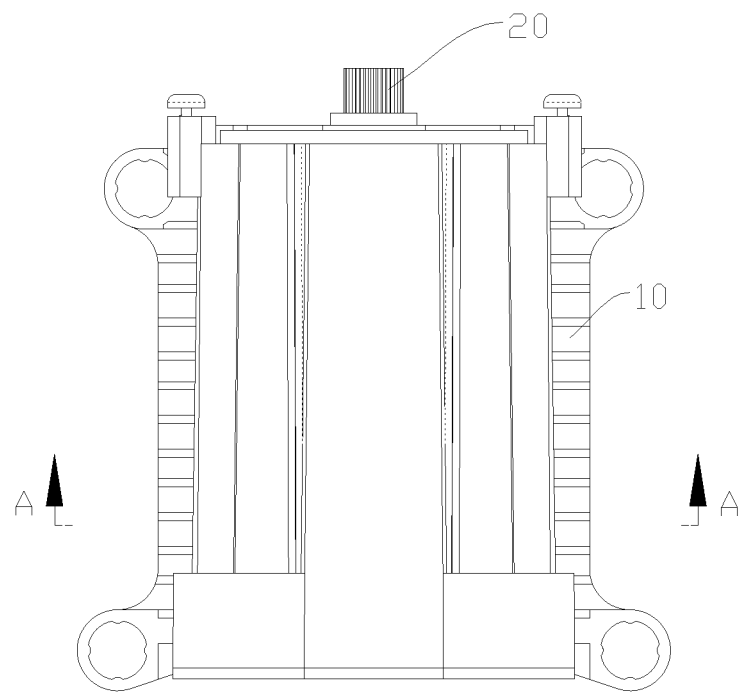
FIG. 8 is a front structural view of the control valve shown in FIG. 1.

As shown in FIGS. 2 to 4, the communication ports in the side wall part 11 include the first communication ports 311, the first communication ports 311 are arranged along the height direction of the side wall part 11 and a circumferential direction of the side wall part 11, and two first communication ports 311 are arranged along the circumferential direction of the side wall part 11. As shown in FIGS. 2 and 4, in this embodiment, the side wall part 11 has eight first communication ports 311, the side wall part 11 has four rows of the first communication ports 311 along the height direction of the side wall part 11, each row of the first communication ports 311 has two first communication ports 311, and correspondingly, the control valve 1 has eight first valve ports 312 in one-to-one correspondence and communicating with the first communication ports 311. As shown in FIGS. 3, 5, and 7, a cross section of the sealing member 41 is of an arc-shaped structure. When the sealing member 41 includes the sealing body 410, the sealing body 410 is arranged between the valve core 20 and the side wall part 11. The sealing body 410 has through holes 411 going through the sealing member 41. The number of the through holes 411 is the same as the number of the first communication ports 311 and the through holes 411 communicate with the first communication ports 311 correspondingly. The through holes 411 are arranged along the height direction of the sealing member 41 and a circumferential direction of the sealing body 410, and the sealing body 410 is provided with two through holes 411 along the circumferential direction of the sealing body 410. In this embodiment, the sealing body 410 has eight through holes 411, the sealing body 410 has four rows of the through holes 411 along the height direction of the sealing body 410, and each row of the through holes 411 has two through holes 411. The inner surface of the sealing body 410 is an arc surface, and the arc surface contacts the valve core 20. A central angle corresponding to the arc surface of the sealing body 410 is defined as α, and α is greater than or equal to 100 degrees and less than or equal to 180 degrees. In an embodiment, α is greater than 100 degrees and less than or equal to 110 degrees. Through the above arrangement, the manufacturing difficulty of a manufacturing mold of the sealing member can be reduced, thereby reducing the manufacturing difficulty of the sealing member 41 and reducing the manufacturing cost of the sealing member 41.

As shown in FIG. 7, in some embodiments, on a cross section perpendicular to the height direction of the side wall part 11, a maximum central angle formed by edges of the two first communication ports 311 arranged along the circumferential direction of the side wall part 11 and a circle center of the side wall part 11 is defined as β, and β is equal to 90 degrees. Correspondingly, on a cross section perpendicular to the height direction of the sealing member 41, a maximum central angle formed by edges of the two through holes 411 of the sealing member 41 and a circle center of the arc surface of the sealing member 41 is 90 degrees. During the operation of the control valve 1, due to the influence of the control accuracy of the driving element or the delay of signal transmission or the rotation inertia of the valve core 20, the valve core 20 has a rotation tolerance, an angle of the rotation tolerance is defined as θ, and α≥β+2θ. In an embodiment, the angle of the rotation tolerance of the valve core 20 may be +5 degrees, that is, when the driving element stops driving the valve core 20 to rotate, due to the influence of the control accuracy of the driving element or the delay of signal transmission or the rotation inertia of the valve core 20, the valve core 20 may stop rotating 5 degrees before the valve core 20 rotates to a set angle or continue to rotate 5 degrees after the valve core 20 rotates to the set angle, so that the valve core 20 has a rotation tolerance. In order to make the sealing member 41 contact with the valve core 20 during the rotation of the valve core 20, and make the sealing member 41 have better sealing performance, and make the sealing member 41 have a relatively large expansion space and relatively low manufacturing difficulty, in some embodiments, the central angle α corresponding to the arc surface of the sealing body 410 is 100 degrees.

Figure 9:
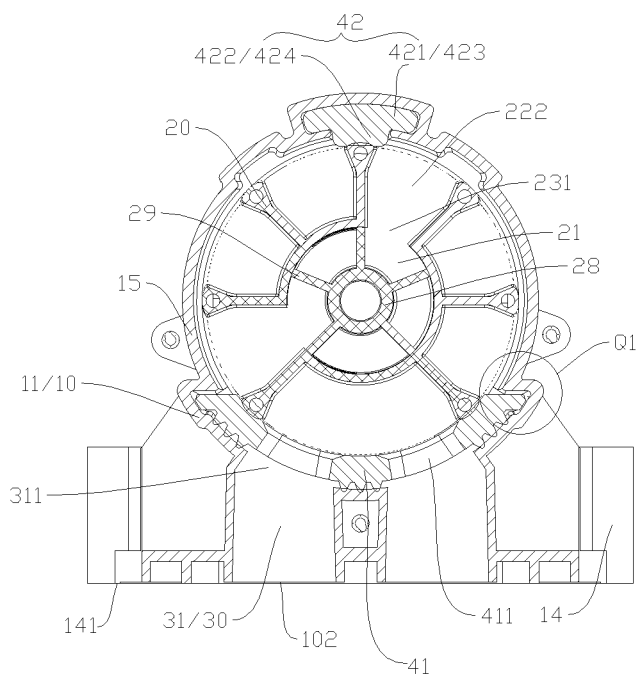
FIG. 9 is a schematic diagram of a cross-section structure along A-A direction in FIG. 8.
Figure 10:
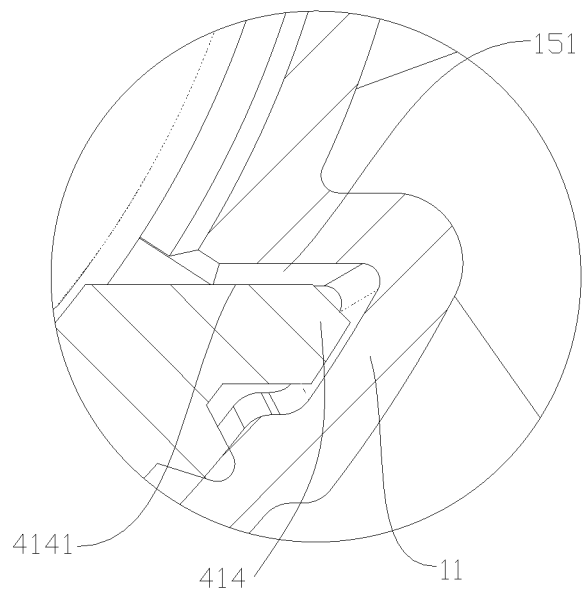
FIG. 10 is a schematic diagram of an enlarged structure at position Q1 in FIG. 9.
Figure 11:
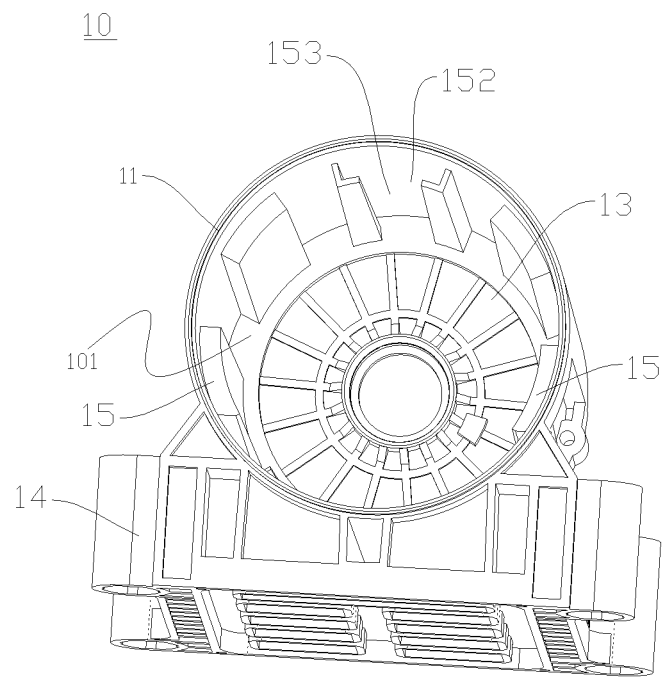
FIG. 11 is a structural schematic diagram of a valve body provided according to another embodiment of the present application.

In order to make the sealing member 41 be stably limited in the valve cavity 101 of the valve body 10, as shown in FIGS. 7 to 11, in some embodiments, the sealing member 41 further includes limiting parts 414 located at both ends of the sealing body 410 in the circumferential direction of the sealing body 410. Each limiting part 414 has a limiting surface 4141, the limiting surface 4141 is connected between an inner surface and an outer surface of the sealing member 41. The valve body 10 further includes a blocking part 15, as shown in FIGS. 9 and 10, the blocking part is a part of the side wall part 11, alternatively, as shown in FIG. 11, the blocking part 15 may be fixedly connected to the side wall part 11 and the blocking part 15 is arranged in the valve cavity 101. The blocking part 15 has a blocking surface 151, the blocking surface 151 may extend along a radial direction of the side wall part 11 or extend at an angle to the radial direction of the side wall part 11. The blocking surface 151 is located in the valve cavity 101, and the limiting surface 4141 is in contact with the blocking surface 151. Through the above arrangement, the limiting surface 4141 and the blocking surface 151 are coordinated with each other to prevent the rotation of the sealing member 41 and improve the sealing performance of the sealing member 41.

Since the cross-section of the sealing member 41 is of an arc-shaped structure, the valve core 20 is prone to eccentricity during the process of the valve core 20 pressing the sealing member 41. Referring to FIG. 9, in some embodiments, the control valve 1 further includes a balance sealing block 42, and the balance sealing block 42 is arranged between the side wall part 11 and the valve core 20 along the radial direction of the valve core 20. The balance sealing block 42 and the sealing member 41 are respectively arranged on two sides of the valve core 20 in the radial direction of the valve core 20. A surface, facing the valve core 20, of the balance sealing block 42 is an arc surface, an axis of the arc surface of the balance sealing block 42 coincides with an axis of the inner surface of the sealing body 410, and a radius of the arc surface of the balance sealing block 42 is equal to a radius of the inner surface of the sealing body 410. In an embodiment, a height of the balance sealing block 42 may be equal to a height of the sealing member 41. Along the height direction of the valve core 20, a height of the sealing member 41 where the sealing member 41 contacts the valve core 10 and a height of the balance sealing block 42 where the balance sealing block 42 contacts the valve core 20 are equal. Through the above arrangement, the balance sealing block 42 and the sealing member 41 can produce equal forces on the valve core 20 that are in opposite directions, coaxiality of the valve core 20 and the side wall part 11 can be maintained, the rotation stability of the valve core 20 can be improved, fluid leakage caused by the eccentricity of the valve core 20 can be prevented, the sealing performance of the control valve 1 can be improved, and the stability of the control valve 1 for fluid control can be improved.

Figure 6:
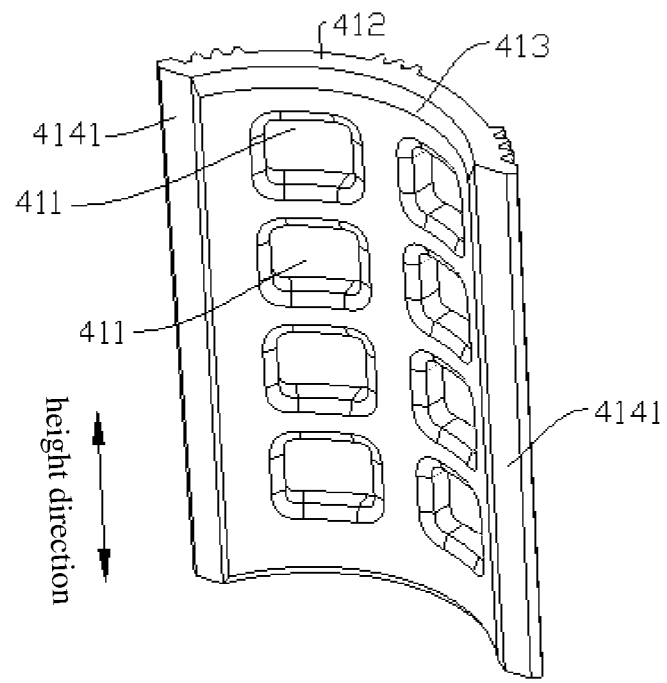
FIG. 6 is a structural schematic diagram of a sealing member provided according to an embodiment of the present application.

In order to make the valve core 20 rotate stably under a relatively small driving force, as shown in FIGS. 5 to 7, in some embodiments, the sealing member 41 includes a first elastic pad 412 and a first sealing element 413 that are fixedly connected. The first elastic pad 412 is arranged between the first sealing element 413 and the side wall part 11, and the first sealing element 413 is arranged between the first elastic pad 412 and the valve core 20 and is in contact with the valve core 20. The main material of the first sealing element 413 may be Teflon, for example, the first sealing element 413 may be formed by processing Teflon, the first elastic pad 412 may be formed by processing rubber, and the first elastic pad 412 and the first sealing element 413 are fixed by bonding to form an integrated structure. A roughness of a surface, facing the valve core 20, of the first sealing element 412 is smaller than a roughness of a surface, facing away from the valve core 20, of the first elastic pad 412. The main material of the first sealing element 412 is Teflon, so that the first sealing element 412 can not only play a role of sealing, but also play a role of lubrication, which can reduce a friction force between the valve core 20 and the sealing member 41, thereby relatively reducing the driving force of the control valve 1. The first elastic pad 421 includes a main body part and a protrusion part, and the protrusion part is in contact with the side wall part 11. The protrusion part may include multiple axial protrusions and multiple circumferential protrusions intersected with each other. Each axial protrusion extends along a height direction of the first elastic pad 421, and each circumferential protrusion extends along a circumferential direction of the first elastic pad 421. By providing the multiple protrusions, the amount of the compression deformation of the sealing member can be improved, and the sealing performance of the sealing member 41 can be improved.

Figure 12:
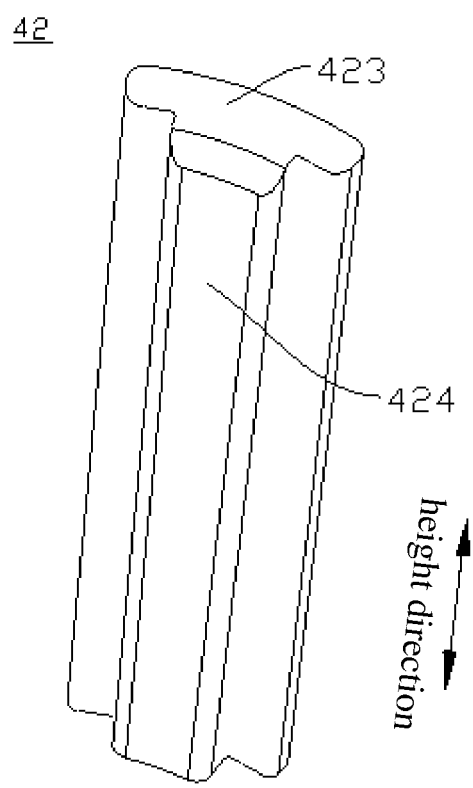
FIG. 12 is a structural schematic diagram of a balance sealing block provided according to an embodiment of the present application.

Based on this, as shown in FIGS. 9 and 12, the balance sealing block 42 may include a second elastic pad 423 and a second sealing element 424 that are fixedly connected. The second elastic pad 423 is arranged between the second sealing element 424 and the side wall part 11, the second sealing element 424 is arranged between the second elastic pad 423 and the valve core 20 and is in contact with the valve core 20. The main material of the second sealing element 424 may be Teflon, for example, the second sealing element 424 may be formed by processing Teflon, the second elastic pad 423 may be formed by processing rubber, and the second elastic pad 423 and the second sealing element 424 are fixed by bonding to form an integrated structure. A roughness of a surface of the second sealing element 424 facing the valve core 20 is smaller than that a roughness of a surface, facing away from the valve core 20, of the second elastic pad 423. The main material of the second sealing element 424 is Teflon, so that the second sealing element 424 can not only play a role of sealing, but also play a role of lubrication, which can reduce the friction force between the valve core 20 and the sealing member 41, thereby relatively reducing the driving force of the control valve 1.

In order to make the balance sealing block 42 be stably limited in the valve cavity 101, as shown in FIGS. 9 to 12, in some embodiments, the valve body 10 has an accommodation cavity 152 and an opening 153 along the radial direction of the side wall part 11, and the accommodation cavity 152 communicates with the valve cavity 101 through the opening 153. An area of a cross section of the accommodation cavity 152 is larger than an area of a cross section of the opening 153. The balance sealing block 42 includes a first portion 421 and a second portion 422 fixedly connected to each other, an area of a cross section of the first portion 421 is greater than an area of a cross section of the second portion 422, the first portion 421 is arranged in the accommodation cavity 152, and the second portion 422 is arranged between the valve core 20 and the first portion 421. The second portion 422 goes through the opening 153 to contact the valve core 20. The cross section is a cross section obtained by cutting the control valve 1 along a direction perpendicular to a height direction of the balance sealing block 42 or along the direction perpendicular to the height direction of the side wall part 11. Through the above arrangement, the balance sealing block 42 can be limited in the accommodation cavity 152, thereby facilitating the mounting of the balance sealing block 42. When the balance sealing block 42 includes a second elastic pad 423 and a second sealing element 424, the first portion 421 may be the second elastic pad 423, the second portion 422 may be the second sealing element 424, or the first portion 421 may be a structure formed by the second elastic pad 423 and a part of the second sealing element 424, and the second portion 422 may be a structure formed by another part of the second sealing element 424.

Referring to FIGS. 1 to 3, 9, and 13 to 15, in some embodiments, the communication ports of the side wall part 11 further includes a second communication port 321, and the second communication port 321 is located at an end of the side wall part 11 in the height direction of the side wall part 11 and is provided away from the sealing member 41. The valve core 20 is of a columnar structure, and the valve core 20 includes a top plate 201, a bottom plate 202, an inner communication cavity 21, multiple outer communication cavities 22, a first partition 23 and a second partition 24. Along the height direction of the valve core 20, the multiple outer communication cavities 22, the first partition 23, and the second partition 24 are located between the top plate 201 and the bottom plate 202, the inner communication cavity 21 is located between the top plate 201 and the bottom plate 202 and penetrates through the bottom plate 202. At least part of the outer communication cavities 22 are distributed on an outer peripheral side of the inner communication cavity 21, the first partition 23 is located between the inner communication cavity 21 and the outer communication cavity 22, and the second partition 24 is located between two adjacent outer communication cavities 22. The first partition 23 has a hole-channel 231, and the inner communication cavity 21 communicates with a part of the outer communication cavities 22 through the hole-channel 231. The second communication port 321 communicates with the inner communication cavity 21 through the valve cavity 101, the first communication ports 311 communicate with the outer communication cavities 22 through the through holes 411 of the sealing body 410. Each of the outer communication cavities 22 is separated into an independent space through the second partition 24. The valve core 20 is rotated to open or close two valve ports corresponding to the outer communication cavity 22 through the outer communication cavity 22, and/or, the valve core 20 is rotated to open or close the corresponding two valve ports through the inner communication cavity 21, the hole-channel 231, and the outer communication cavity 22. One of the two valve ports corresponds to the inner communication cavity 21 and the other of the two valve ports corresponds to the outer communication cavity 22. Through the above arrangement, one control valve 1 can control multiple flow paths, which is more convenient and compact in use.

Figure 13:
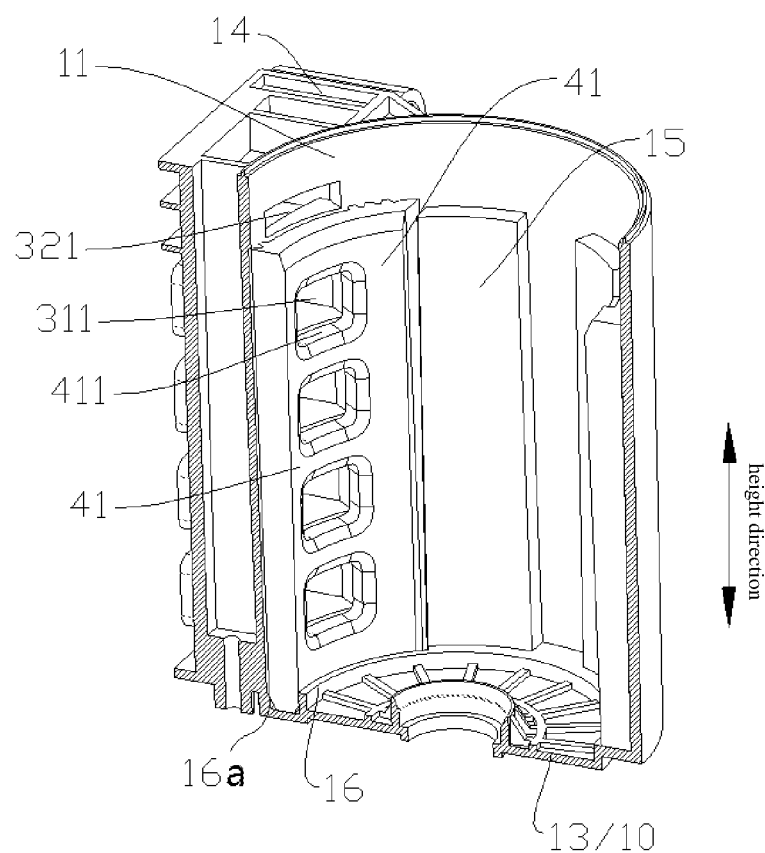
FIG. 13 is a schematic diagram of a partial cross-section structure of a combination structure of a valve body and a sealing member provided according to an embodiment of the present application at another position.
Figure 14:
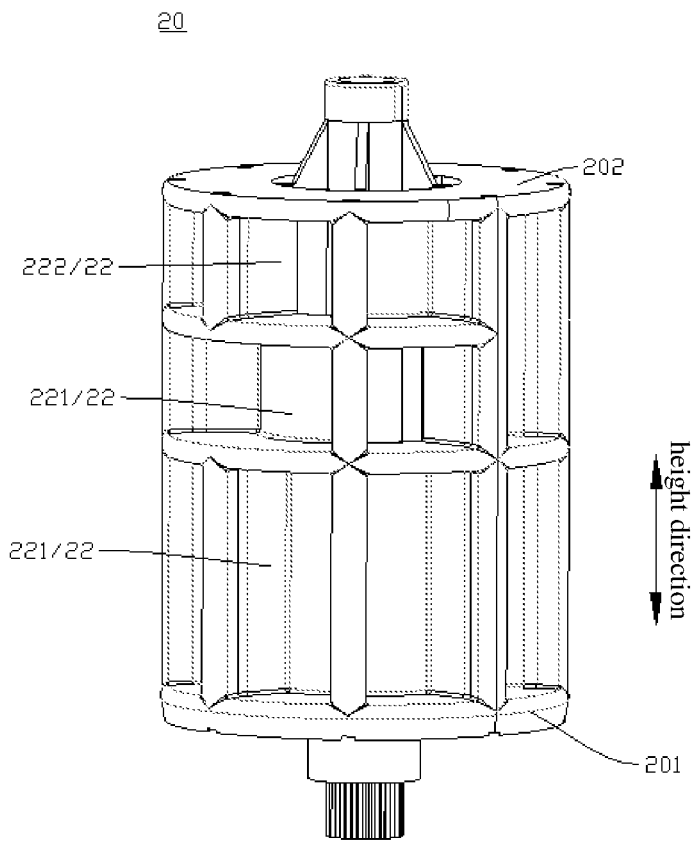
FIG. 14 is a structural schematic diagram of a valve core provided according to an embodiment of the present application.
Figure 15:
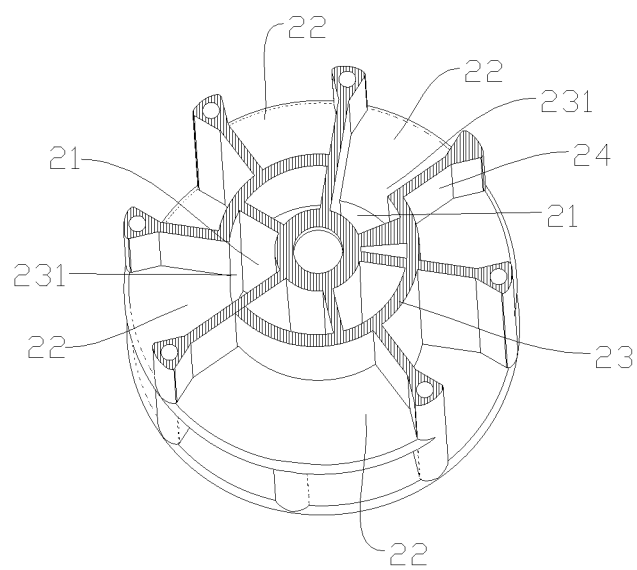
FIG. 15 is a schematic cross-sectional structural view of the valve core in FIG. 14.

As shown in FIG. 13, in order to limit the sealing member 41, in some embodiments, the top wall part 13 and the side wall part 11 of the valve body 10 are formed as an integrated structure by injection molding. In this way, the valve body 10 further includes a protrusion portion 16, and the protrusion portion 16 protrudes from the top wall part 13 and is arranged in the valve cavity. The protrusion portion 16 has a first limit groove 16a, and a groove opening of the first limit groove 16a communicates with the valve cavity. A part of the inner surface of the side wall part 11 may form a groove wall of the first limit groove 16a, an end of the sealing member 41 in the height direction of the sealing member 41 is arranged in the first limit groove 16a, thereby limiting the assembly position of the sealing member 41. In this way, a width of the first limit groove 16a may be greater than or equal to a thickness of the sealing member 41 in the radial direction of the sealing member 41. In order to improve the strength of the valve body 10, multiple connecting ribs may be provided on the top wall part 13, and the connecting ribs are arranged along the radial direction of the top wall part 13. Alternatively, a circle of connecting ribs extending along the circumferential direction of the top wall part 13 may be provided on the top wall part 13, so as to improve the structural strength of the top wall part 13. In an embodiment, in order to limit the position of the balance sealing block 42, the protrusion portion 16 may further include a second limit groove, a groove opening of the second limit groove communicates with the valve cavity, an end of the balance sealing block 42 in the height direction of the balance sealing block 42 is arranged in the second limit groove, and a width of the second limit groove may be greater than or equal to a thickness of the balance sealing block 42 in the radial direction of the balance sealing block 42.

Referring to FIGS. 1 to 3, when the communication ports further include a second communication port 321 and the valve body includes a mounting part 14, the second communication port 321 is located at an end of the side wall part 11 in the height direction of the side wall part 11 and is located on a side of the side wall part 11 away from the sealing member 41. The mounting part 14 has a mounting surface 141. On the mounting surface 141, the valve ports 102 communicating with the first communication ports 311 and the valve port 102 communicating with the second communication port 321 are rectangular, and cross-sectional areas of the valve ports 102 communicating with the first communication ports 311 and the valve port 102 communicating with the second communication port 321 are equal. Through the above arrangement, fluid flow quantities passing through the valve ports 102 can substantially be equal.

The valve ports 102 communicating with the first communication ports 311 are defined as first valve ports 312, and the valve port 102 communicating with the second communication port 321 is defined as a second valve port 322. On the mounting surface 141, a length of the second valve port 322 is greater than twice a length of the first valve port 312. The mounting part 14 of the valve body 10 may further include a reinforcing rib 142, the reinforcing rib 142 extends along a width direction of the second valve port 322 and is connected between two surfaces of the second valve port 322 oppositely disposed along a height direction of the control valve. Through the above arrangement, the strength of the control valve 1 at each valve port 102 can be improved, and the quality of the control valve 1 can be improved.

In summary, according to the control valve 1 provided by the embodiments of the present application, the control valve 1 includes the side wall part 11, the side wall part 11 has the first communication ports 311, the first communication ports 311 are arranged along the height direction of the side wall part 11 and the circumferential direction of the side wall part 11, and the side wall part 11 is provided with two first communication ports 311 along the circumferential direction of the side wall part 11. Compared with the embodiment of arranging all the first communication ports 311 along the circumferential direction of the side wall part 11, the area of the side wall part 11 that needs to be sealed in the circumferential direction of the side wall part 11 can be reduced. Correspondingly, the sealing body 410 of the sealing member 41 is arranged between the side wall part 11 and the valve core 20, and the sealing body 410 has the through holes 411 communicating with the first communication ports 311. The through holes 411 are arranged along the height direction of the sealing member 41 and the circumferential direction of the sealing member 41, and two through holes 411 are arranged along the circumferential direction of the sealing member 41, which can relatively reduce the arc length of the arc surface of the sealing member 41. By setting the central angle corresponding to the arc surface of the sealing member 41 to be greater than or equal to 90 degrees and less than or equal to 180 degrees, compared with the central angle corresponding to the arc surface of the sealing member 41 greater than 180 degrees, the arc length of the arc surface of the sealing member 41 in the embodiments of the present application is smaller, which can reduce the manufacturing difficulty of the product mold, reduce the manufacturing cost of the sealing member 41 and the control valve 1, and improve the sealing performance of the control valve 1, so as to facilitate popularization and application.

It should be noted that the above embodiments are only used to illustrate the present application and not to limit the technical solutions described in the present application, For example, definitions for directions such as "front", "back", "left", "right", "up", "down". Although this specification has described the present application in detail with reference to the above embodiments, it should be understood that those skilled in the art can still modify, combine or replace the present application, all technical solutions and improvements thereof that do not deviate from the spirit and the scope of the present application shall fall within the scope of the claims of the present application.

What is claimed is:

1. A control valve, comprising a valve body, a valve core, and a sealing member, wherein
the valve body comprises a side wall part, the control valve has a valve cavity, the side wall part is a peripheral wall of the valve cavity or at least part of the peripheral wall, at least part of the valve core is arranged in the valve cavity and is configured to be driven to rotate, at least part of the sealing member is arranged between the valve core and the side wall part along a radial direction of the valve core, the control valve is provided with a plurality of communication ports, the plurality of communication ports comprise a plurality of first communication ports, the plurality of first communication ports are arranged along a height direction of the side wall part and a circumferential direction of the side wall part, and two columns of the first communication ports are arranged in the side wall part along the circumferential direction of the side wall part; and
the sealing member comprises a sealing body, wherein the sealing body is arranged between the valve core and the side wall part, the sealing body has a plurality of through holes penetrating through the sealing member, at least part of the plurality of through holes are correspondingly communicated with the first communication ports, the plurality of through holes are arranged along a height direction of the sealing body and a circumferential direction of the sealing body, two columns of the through holes are arranged in the sealing body along the circumferential direction of the sealing body, an inner surface of the sealing body is an arc surface, and a central angle corresponding to the arc surface of the sealing body is greater than or equal to 100 degrees and less than or equal to 180 degrees.

2. The control valve according to claim 1, wherein on a cross section perpendicular to the height direction of the side wall part, a maximum central angle formed by edges of the two first communication ports arranged along the circumferential direction of the side wall part and a circle center of the side wall part is 90 degrees; and on a cross section perpendicular to the height direction of the sealing member, a maximum central angle formed by edges of the two through holes of the sealing member and a circle center of the arc surface of the sealing member is 90 degrees, and a central angle corresponding to the arc surface of the sealing body is 100 degrees.

3. The control valve according to claim 2, wherein the communication ports further comprises a second communication port, and the second communication port is located on a side of the side wall part in the height direction of the side wall part;

the valve core comprises an inner communication cavity and an outer communication cavity, the outer communication cavity is located on an outer peripheral side of the inner communication cavity, the valve core comprises a first partition, the first partition is arranged between the inner communication cavity and the outer communication cavity, and the first partition has a hole-channel, the inner communication cavity communicates with the outer communication cavity through the hole-channel; and the first communication ports communicate with the outer communication cavity through the through holes of the sealing body, and the second communication port communicates with the outer communication cavity through the valve cavity, the inner communication cavity, and the hole-channel.

4. The control valve according to claim 2, wherein the control valve comprises at least five channels, the side wall part has at least five communication ports, one end of each of the at least five channels penetrates through the side wall part to form the communication port, the other end of each of the at least five channels is configured to form a valve port of the control valve, the valve body further comprises a mounting part, the mounting part is fixedly connected to the side wall part and is arranged on a side of the side wall part facing away from the valve cavity, the mounting part comprises a mounting surface, the at least five channels of the control valve penetrate through the mounting part, and the valve port is provided in the mounting surface; and the valve ports communicating with the first communication ports are arranged in an array along the height direction of the side wall part and a direction perpendicular to the height direction of the side wall part.

5. The control valve according to claim 1, wherein the sealing member further comprises limiting parts located at both ends of the sealing body in the circumferential direction of the sealing body, each of the limiting parts has a limiting surface, and the limiting surface is connected between an inner surface and an outer surface of the sealing member; and the valve body further comprises a blocking part, the blocking part is fixedly connected to the side wall part or is a part of the side wall part, the blocking part has blocking surfaces located at both ends of the blocking part in a circumferential direction of the blocking part, the blocking surfaces are arranged in the valve cavity, and the limiting surface is configured to be in contact with the blocking surface.

6. The control valve according to claim 5, further comprising a balance sealing block, wherein the balance sealing block is arranged between the side wall part and the valve core along the radial direction of the valve core, the balance sealing block and the sealing member are respectively arranged on two sides of the valve core in the radial direction of the valve core, a surface, facing the valve core, of the balance sealing block is an arc surface, an axis of the arc surface of the balance sealing block coincides with an axis of the inner surface of the sealing body, and a radius of the arc surface of the balance sealing block and a radius of the inner surface of the sealing body are equal.

7. The control valve according to claim 6, wherein the valve core is arranged coaxially with the side wall part.

8. The control valve according to claim 7, wherein the balance sealing block comprises a second elastic pad and a second sealing element that are fixedly connected, the second elastic pad is arranged between the second sealing element and the side wall part, the second sealing element is arranged between the second elastic pad and the valve core and contacts the valve core, a roughness of a surface, facing the valve core, of the second sealing element is smaller than a roughness of a surface, facing away from the valve core, of the second elastic pad.

9. The control valve according to claim 6, wherein the sealing member comprises a first elastic pad and a first sealing element that are fixedly connected, the first elastic pad is arranged between the first sealing element and the side wall part, the first sealing element is arranged between the first elastic pad and the valve core and contacts the valve core, a roughness of a surface of the first sealing element facing the valve core is smaller than a roughness of a surface of the first elastic pad facing away from the valve core.

10. The control valve according to claim 9, wherein the balance sealing block comprises a second elastic pad and a second sealing element that are fixedly connected, the second elastic pad is arranged between the second sealing element and the side wall part, the second sealing element is arranged between the second elastic pad and the valve core and contacts the valve core, a roughness of a surface, facing the valve core, of the second sealing element is smaller than a roughness of a surface, facing away from the valve core, of the second elastic pad.

11. The control valve according to claim 10, wherein
the valve body has an accommodation cavity and an opening along a radial direction of the side wall part, the accommodation cavity communicates with the valve cavity through the opening, and an area of a cross section of the accommodation cavity is greater than an area of a cross section of the opening; and
the balance sealing block protrudes from the opening, and the balance sealing block comprises a first portion and a second portion fixedly connected to each other, an area of a cross section of the first portion is greater than an area of a cross section of the opening, the first portion is arranged in the accommodation cavity, and the second portion goes through the opening to contact the valve core.

12. The control valve according to claim 6, wherein the balance sealing block comprises a second elastic pad and a second sealing element that are fixedly connected, the second elastic pad is arranged between the second sealing element and the side wall part, the second sealing element is arranged between the second elastic pad and the valve core and contacts the valve core, a roughness of a surface, facing the valve core, of the second sealing element is smaller than a roughness of a surface, facing away from the valve core, of the second elastic pad.

13. The control valve according to claim 12, wherein
the valve body has an accommodation cavity and an opening along a radial direction of the side wall part, the accommodation cavity communicates with the valve cavity through the opening, and an area of a cross section of the accommodation cavity is greater than an area of a cross section of the opening; and
the balance sealing block protrudes from the opening, and the balance sealing block comprises a first portion and a second portion fixedly connected to each other, an area of a cross section of the first portion is greater than an area of a cross section of the opening, the first portion is arranged in the accommodation cavity, and the second portion goes through the opening to contact the valve core.

14. The control valve according to claim 5, wherein
the communication ports further comprises a second communication port, and the second communication port is located on a side of the side wall part in the height direction of the side wall part;
the valve core comprises an inner communication cavity and an outer communication cavity, the outer communication cavity is located on an outer peripheral side of the inner communication cavity, the valve core comprises a first partition, the first partition is arranged between the inner communication cavity and the outer communication cavity, and the first partition has a hole-channel, the inner communication cavity communicates with the outer communication cavity through the hole-channel; and
the first communication ports communicate with the outer communication cavity through the through holes of the sealing body, and the second communication port communicates with the outer communication cavity through the valve cavity, the inner communication cavity, and the hole-channel.

15. The control valve according to claim 5, wherein
the control valve comprises at least five channels, the side wall part has at least five communication ports, one end of each of the at least five channels penetrates through the side wall part to form the communication port, the other end of each of the at least five channels is configured to form a valve port of the control valve, the valve body further comprises a mounting part, the mounting part is fixedly connected to the side wall part and is arranged on a side of the side wall part facing away from the valve cavity, the mounting part comprises a mounting surface, the at least five channels of the control valve penetrate through the mounting part, and the valve port is provided in the mounting surface; and
the valve ports communicating with the first communication ports are arranged in an array along the height direction of the side wall part and a direction perpendicular to the height direction of the side wall part.

16. The control valve according to claim 1, wherein
the communication ports further comprises a second communication port, and the second communication port is located on a side of the side wall part in the height direction of the side wall part;
the valve core comprises an inner communication cavity and an outer communication cavity, the outer communication cavity is located on an outer peripheral side of the inner communication cavity, the valve core comprises a first partition, the first partition is arranged between the inner communication cavity and the outer communication cavity, and the first partition has a hole-channel, the inner communication cavity communicates with the outer communication cavity through the hole-channel; and
the first communication ports communicate with the outer communication cavity through the through holes of the sealing body, and the second communication port communicates with the outer communication cavity through the valve cavity, the inner communication cavity, and the hole-channel.

17. The control valve according to claim 1, wherein
the control valve comprises at least five channels, the side wall part has at least five communication ports, one end of each of the at least five channels penetrates through the side wall part to form the communication port, the other end of each of the at least five channels is configured to form a valve port of the control valve, the valve body further comprises a mounting part, the mounting part is fixedly connected to the side wall part and is arranged on a side of the side wall part facing away from the valve cavity, the mounting part comprises a mounting surface, the at least five channels of the control valve penetrate through the mounting part, and the valve port is provided in the mounting surface; and
the valve ports communicating with the first communication ports are arranged in an array along the height direction of the side wall part and a direction perpendicular to the height direction of the side wall part.

18. The control valve according to claim 17, wherein
the communication ports further comprise a second communication port, the second communication port is located on a side of the side wall part in the height direction of the side wall part; and
on the mounting surface, the valve ports communicating with the first communication ports and the valve port communicating with the second communication port are rectangular, and cross-sectional areas of the valve ports communicating with the first communication ports and the valve port communicating with the second communication port are equal.

19. The control valve according to claim 18, wherein
the valve port communicating with the first communication port is defined as a first port, and the valve port communicating with the second communication port is defined as a second port, a length of the second port is greater than twice a length of the first port on the mounting surface, and
the mounting part comprises a reinforcing rib, wherein the reinforcing rib extends along a width direction of the second port and is connected between two surfaces of the second port oppositely disposed along a height direction of the control valve.

20. A sealing member, comprising a sealing body, wherein the sealing body has a plurality of through holes going through the sealing member, the plurality of through holes are arranged along a height direction of the sealing body and a circumferential direction of the sealing body, two columns of the through holes are arranged in the sealing body along the circumferential direction of the sealing body, an inner surface of the sealing body is an arc surface, a central angle corresponding to the arc surface of the sealing body is greater than 100 degrees and less than or equal to 180 degrees.

* * * * *